(12) United States Patent
Ding et al.

(10) Patent No.: US 11,093,099 B2
(45) Date of Patent: Aug. 17, 2021

(54) DISPLAY SUBSTRATE HAVING A PLURALITY OF CORE-COIL ASSEMBLIES CONFIGURED TO DETECT A TOUCH AND DISPLAY PANEL HAVING THE SAME

(71) Applicants: BOE TECHNOLOGY GROUP CO., LTD., Beijing (CN); Ordos Yuansheng Optoelectronics Co., Ltd., Inner Mongolia (CN)

(72) Inventors: Duolong Ding, Beijing (CN); Huafeng Liu, Beijing (CN); Shengwei Zhao, Beijing (CN); Chaochao Sun, Beijing (CN); Chao Wang, Beijing (CN); Jingping Lv, Beijing (CN); Meng Yang, Beijing (CN); Lei Yang, Beijing (CN); Chongliang Hu, Beijing (CN); Bule Shun, Beijing (CN); Lin Xie, Beijing (CN)

(73) Assignees: BOE TECHNOLOGY GROUP CO., LTD., Beijing (CN); Ordos Yuansheng Optoelectronics Co., Ltd., Inner Mongolia (CN)

( * ) Notice: Subject to any disclaimer, the term of this patent is extended or adjusted under 35 U.S.C. 154(b) by 668 days.

(21) Appl. No.: 16/065,039

(22) PCT Filed: Jun. 30, 2017

(86) PCT No.: PCT/CN2017/091080
§ 371 (c)(1),
(2) Date: Jun. 21, 2018

(87) PCT Pub. No.: WO2019/000383
PCT Pub. Date: Jan. 3, 2019

(65) Prior Publication Data
US 2021/0208712 A1    Jul. 8, 2021

(51) Int. Cl.
*G06F 3/046*    (2006.01)
*G06F 3/041*    (2006.01)

(52) U.S. Cl.
CPC ............ *G06F 3/046* (2013.01); *G06F 3/0412* (2013.01)

(58) Field of Classification Search
CPC ...... G06F 3/046; G06F 3/0412; G02F 1/1333; G02F 1/13338; G02F 1/133528
See application file for complete search history.

(56) References Cited

U.S. PATENT DOCUMENTS 4,704,501 A * 11/1987 Taguchi ................ G01B 7/004
                                                              345/173
2014/0071360 A1    3/2014   Chang et al.
(Continued)

FOREIGN PATENT DOCUMENTS

| CN | 105589605 A | 5/2016 |
|---|---|---|
| CN | 105739806 A | 7/2016 |

(Continued)

OTHER PUBLICATIONS

Extended European Search Report in the European Patent Application No. 17892074.0, dated Jan. 12, 2021.
(Continued)

*Primary Examiner* — Lisa S Landis
(74) *Attorney, Agent, or Firm* — Intellectual Valley Law, P.C.

(57) ABSTRACT

The present application discloses a first display substrate including a plurality of core-coil assemblies configured to detect a touch. Each of the plurality of core-coil assemblies includes a first base substrate; a core layer on the first base substrate and including a plurality of magnetic permeable cores substantially along a first direction and spaced apart from each other, each of the plurality of magnetic permeable
(Continued)

cores substantially along a second direction; and a conductive coil wound around the plurality of magnetic permeable cores for multiple turns and insulated from the core layer.

18 Claims, 6 Drawing Sheets

(56) References Cited

U.S. PATENT DOCUMENTS

| | | |
|---|---|---|
| 2014/0197938 A1 | 7/2014 | Kern et al. |
| 2016/0349921 A1 | 12/2016 | Mizuhashi et al. |
| 2017/0097720 A1 | 4/2017 | Shin et al. |
| 2017/0269767 A1 | 9/2017 | Yang et al. |
| 2018/0164920 A1 | 6/2018 | Wang et al. |

FOREIGN PATENT DOCUMENTS

| | | |
|---|---|---|
| CN | 205608704 U | 9/2016 |
| EP | 0187372 A2 | 7/1986 |
| JP | 2010277133 A | 12/2010 |
| KR | 20130053963 A | 5/2013 |

OTHER PUBLICATIONS

International Search Report & Written Opinion dated Jun. 30, 2017, regarding PCT/CN2017/091080.

\* cited by examiner

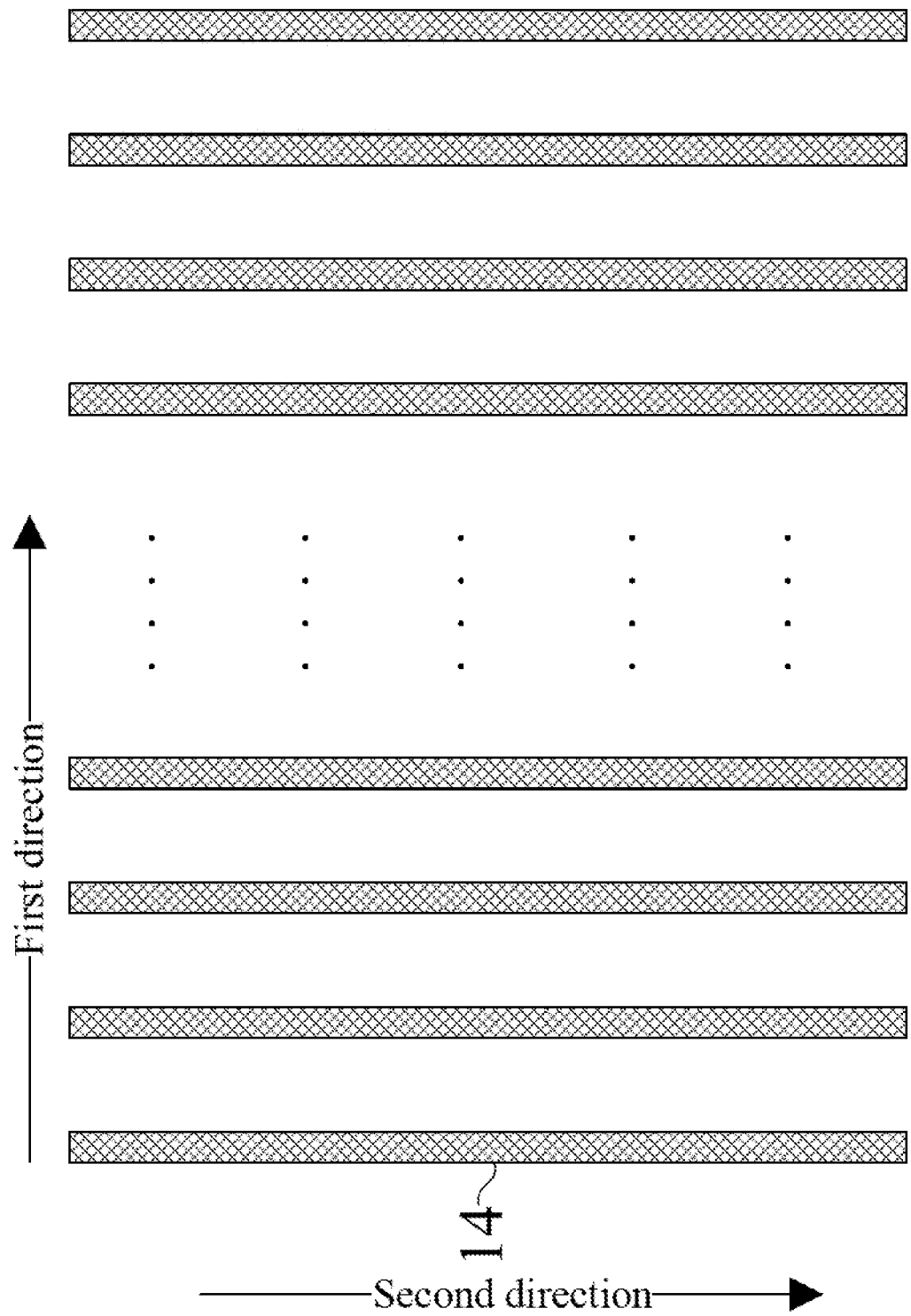

DISPLAY SUBSTRATE HAVING A PLURALITY OF CORE-COIL ASSEMBLIES CONFIGURED TO DETECT A TOUCH AND DISPLAY PANEL HAVING THE SAME

CROSS-REFERENCE TO RELATED APPLICATION

This application is a national stage application under 35 U.S.C. § 371 of International Application No. PCT/CN2017/091080, filed Jun. 30, 2017, the contents of which are incorporated by reference in the entirety.

TECHNICAL FIELD

The present invention relates to touch control technology, more particularly, to a display substrate having a plurality of core-coil assemblies configured to detect a touch and a display panel having the same.

BACKGROUND

Conventional touch devices can be generally categorized into resistive, capacitive, optical, sound wave, and electro-magnetic designs. In recent years, touch devices have been widely used in many electronic devices such as mobile phones, computer display panels, touch screens, satellite navigation devices, digital cameras, etc. In conventional capacitive touch devices, the point on the display panel touched by a finger is detected by detecting the change in the capacitance of the capacitor coupled with the finger through a touch sensing electrode. The conventional touch devices can only detect a two-dimensional location of a touch event, and are unable to detect a third dimension of the touch event, i.e., a pressure applied by the touch.

SUMMARY

In one aspect, the present invention provides a first display substrate comprising a plurality of core-coil assemblies configured to detect a touch, each of the plurality of core-coil assemblies comprising a first base substrate; a core layer on the first base substrate and comprising a plurality of magnetic permeable cores substantially along a first direction and spaced apart from each other, each of the plurality of magnetic permeable cores substantially along a second direction; and a conductive coil wound around the plurality of magnetic permeable cores for multiple turns and insulated from the core layer.

Optionally, the conductive coil comprises a first conductive line layer on a side of the core layer proximal to the first base substrate and comprising a plurality of first conductive lines spaced apart from each other and crossing over the plurality of magnetic permeable cores; and a second conductive line layer on a side of the core layer distal to the first base substrate and comprising a plurality of second conductive lines spaced apart from each other and crossing over the plurality of magnetic permeable cores.

Optionally, projections of two adjacent first conductive lines of the plurality of first conductive lines on the first base substrate sandwiches a projection of one of the plurality of second conductive lines on the first base substrate; and projections of two adjacent second conductive lines of the plurality of second conductive lines on the first base substrate sandwiches a projection of one of the plurality of first conductive lines on the first base substrate.

Optionally, the conductive coil further comprises a third conductive line layer on side of the first conductive line layer proximal to the second conductive line layer and comprising a plurality of third conductive lines; each of the plurality of third conductive lines electrically connects one of the plurality of first conductive lines and one of the plurality of second conductive lines.

Optionally, the first display substrate further comprises a first insulating layer between the first conductive line layer and the third conductive line layer; and a second insulating layer between the second conductive line layer and the third conductive line layer; wherein each of the plurality of third conductive lines is electrically connected to one of the plurality of first conductive lines through a first via extending through the first insulating layer; and each of the plurality of third conductive lines is electrically connected to one of the plurality of second conductive lines through a second via extending through the second insulating layer.

Optionally, each of the plurality of third conductive lines electrically connects adjacent terminals of one of the plurality of first conductive lines and one of the plurality of second conductive lines.

Optionally, the third conductive line layer further comprises an input signal line configured to transmit a touch input signal to the conductive coil; and an output signal line configured to sense a touch signal generated in a corresponding core-coil assembly of the plurality of core-coil assemblies.

Optionally, projections of the plurality of magnetic permeable cores on the first base substrate substantially cover projections of the plurality of third conductive lines on the first base substrate; and the plurality of third conductive lines are insulated from the plurality of magnetic permeable cores.

Optionally, the first display substrate further comprises a gate line layer comprising a plurality of gate lines; wherein the gate line layer and the first conductive line layer are in a same layer and comprises a same material.

Optionally, the first display substrate further comprises a source-dram signal line layer comprising a plurality of source-drain signal lines; wherein the source-dram signal line layer and the third conductive line layer are in a same layer and comprises a same material.

Optionally, the first display substrate further comprises a core insulating layer between the core layer and the third conductive line layer and between the core layer and the source-drain signal line layer; and an interlayer dielectric layer between the first conductive line layer and the third conductive line layer and between the first conductive line layer and the source-drain signal line layer.

Optionally, the plurality of magnetic permeable cores, the plurality of first conductive lines, the plurality of second conductive lines, and the plurality of third conductive lines are substantially in an inter-subpixel region of the first display substrate.

Optionally, each of the plurality of magnetic permeable cores comprises a middle portion and two terminal portions respectively at two ends of the middle portion; and the middle portion has a thickness less than those of the two terminal portions.

In another aspect, the present invention provides a display panel comprising a first display substrate described herein; and a second display substrate facing the first display substrate and spaced apart from the first display substrate; wherein the second display substrate comprises a target layer comprising a plurality of magnetic permeable targets substantially along the first direction and spaced apart from each other, each of the plurality of magnetic permeable targets substantially along the second direction.

Optionally, projections of the plurality of magnetic permeable cores on the first base substrate at least partially overlap with those of the plurality of magnetic permeable targets.

Optionally, projections of the plurality of magnetic permeable cores on the first base substrate substantially overlap with those of the plurality of magnetic permeable targets.

Optionally, the plurality of magnetic permeable targets are configured to be movable relative to the plurality of magnetic permeable cores in response to pressure from a touch, thereby resulting in a change in a reluctance of a magnetic field and a change in an inductance of the conductive coil.

Optionally, the display panel comprises a spacer layer spacing apart the first display substrate and the second display substrate thereby forming a gap between the core layer and the target layer; wherein a decrease in a thickness of the gap results in a decrease in the reluctance of the magnetic field and an increase in the inductance of the conductive coil.

Optionally, the second display substrate further comprises a black matrix layer on a second base substrate; and a projection of the black matrix layer on the second base substrate substantially covers those of the plurality of magnetic permeable targets.

Optionally, the display panel is operated in a time-division driving mode comprising a display mode and a touch control mode; and the conductive coil is configured to conduct touch signal during the touch control mode.

BRIEF DESCRIPTION OF THE FIGURES

The following drawings are merely examples for illustrative purposes according to various disclosed embodiments and are not intended to limit the scope of the present invention.

FIG. 6 is a schematic diagram illustrating the structure of a target layer in some embodiments according to the present disclosure.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a first display substrate having a plurality of core-coil assemblies configured to detect a touch, and a display panel having the same that substantially obviate one or more of the problems due to limitations and disadvantages of the related art. In one aspect, the present disclosure provides a first display substrate having a plurality of core-coil assemblies configured to detect a touch. In some embodiments, each of the plurality of core-coil assemblies includes a first base substrate; a core layer on the first base substrate and including a plurality of magnetic permeable cores substantially along a first direction and spaced apart from each other, each of the plurality of magnetic permeable cores substantially along a second direction; and a conductive coil wound around the plurality of magnetic permeable cores for multiple turns and insulated from the core layer.

Figure 1:
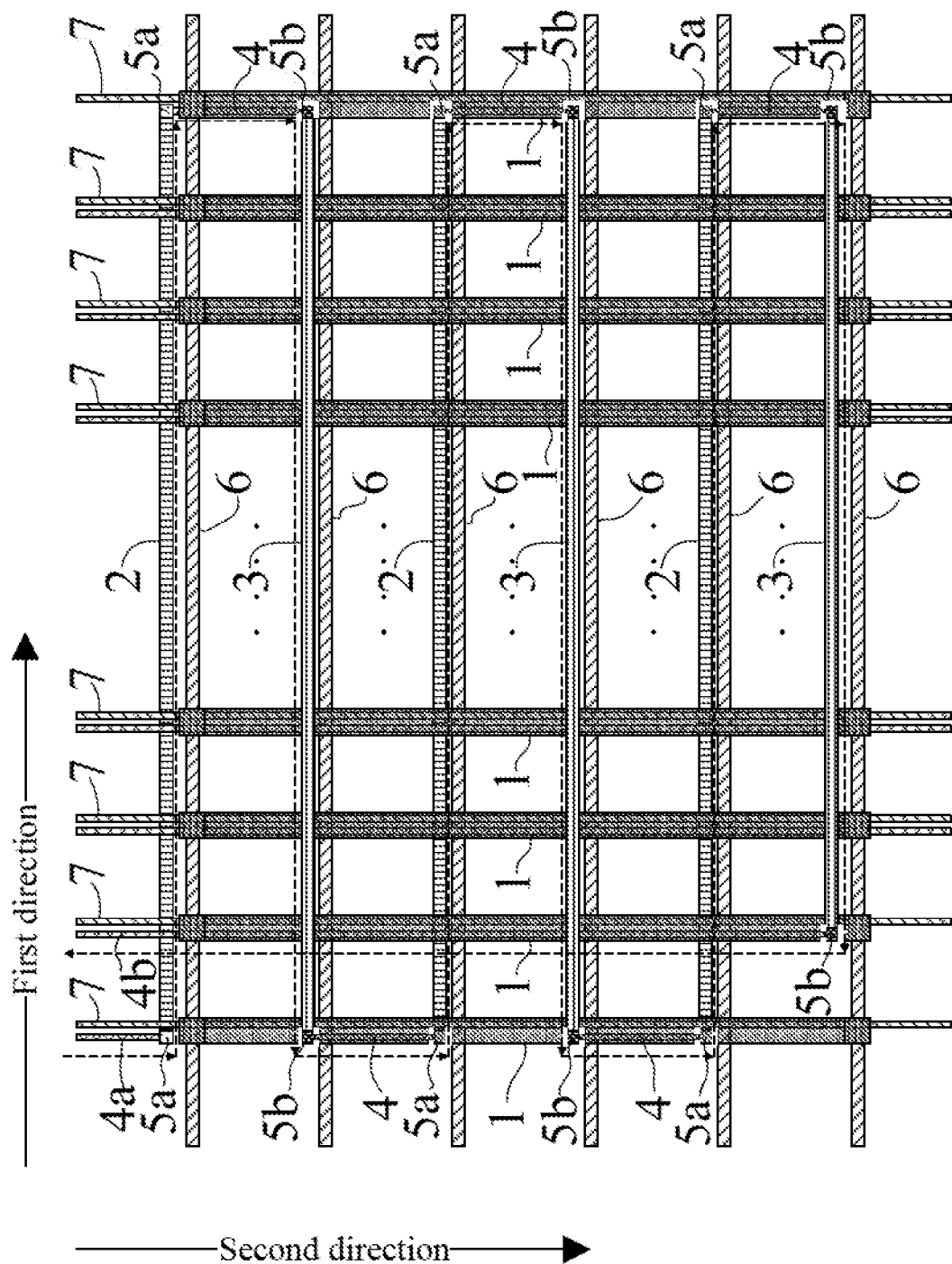
FIG. 1 is a schematic diagram illustrating the structure of a first display substrate in some embodiments according to the present disclosure.
Figure 2:
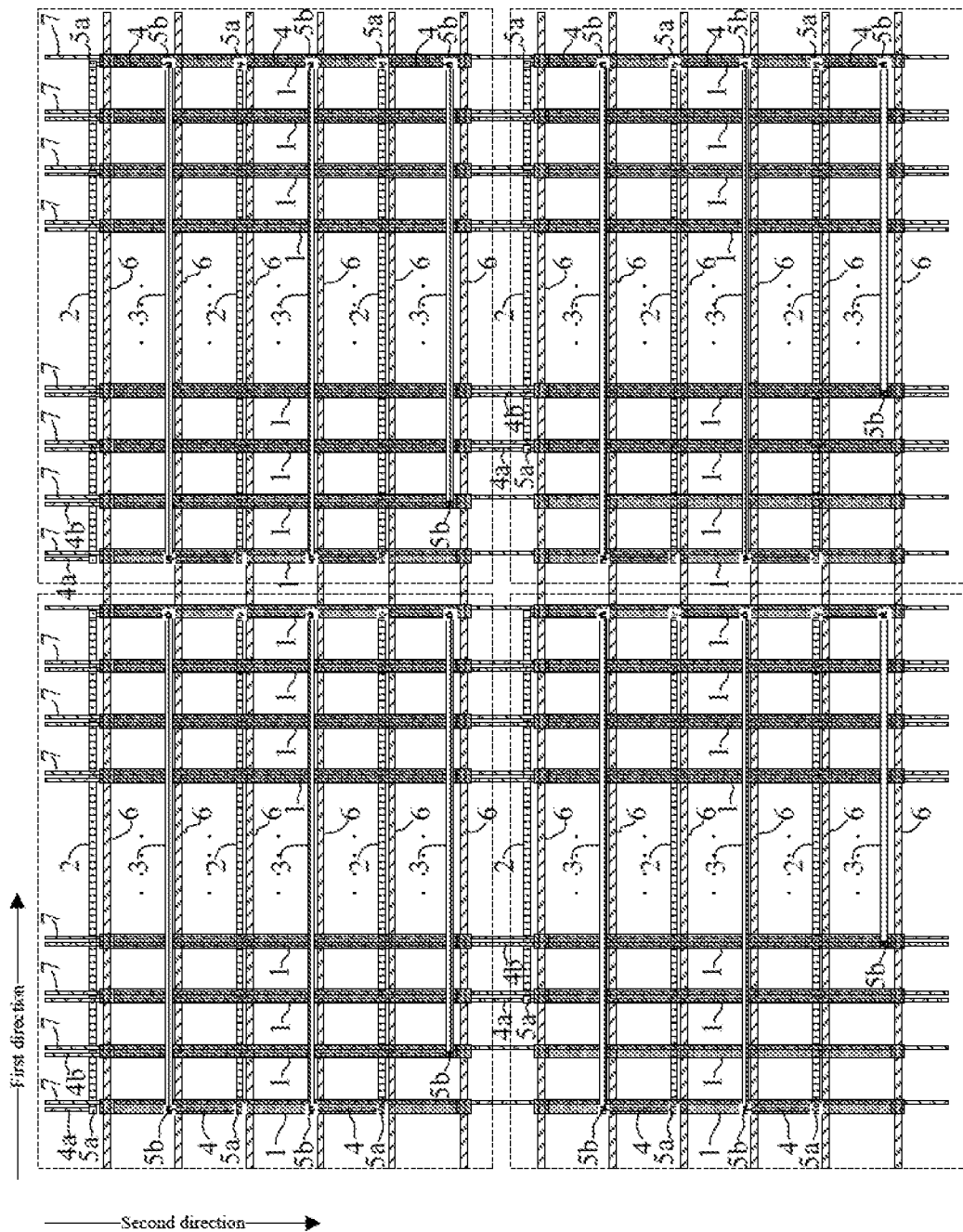
FIG. 2 is a schematic diagram illustrating the structure of a first display substrate in some embodiments according to the present disclosure.
Figure 3:
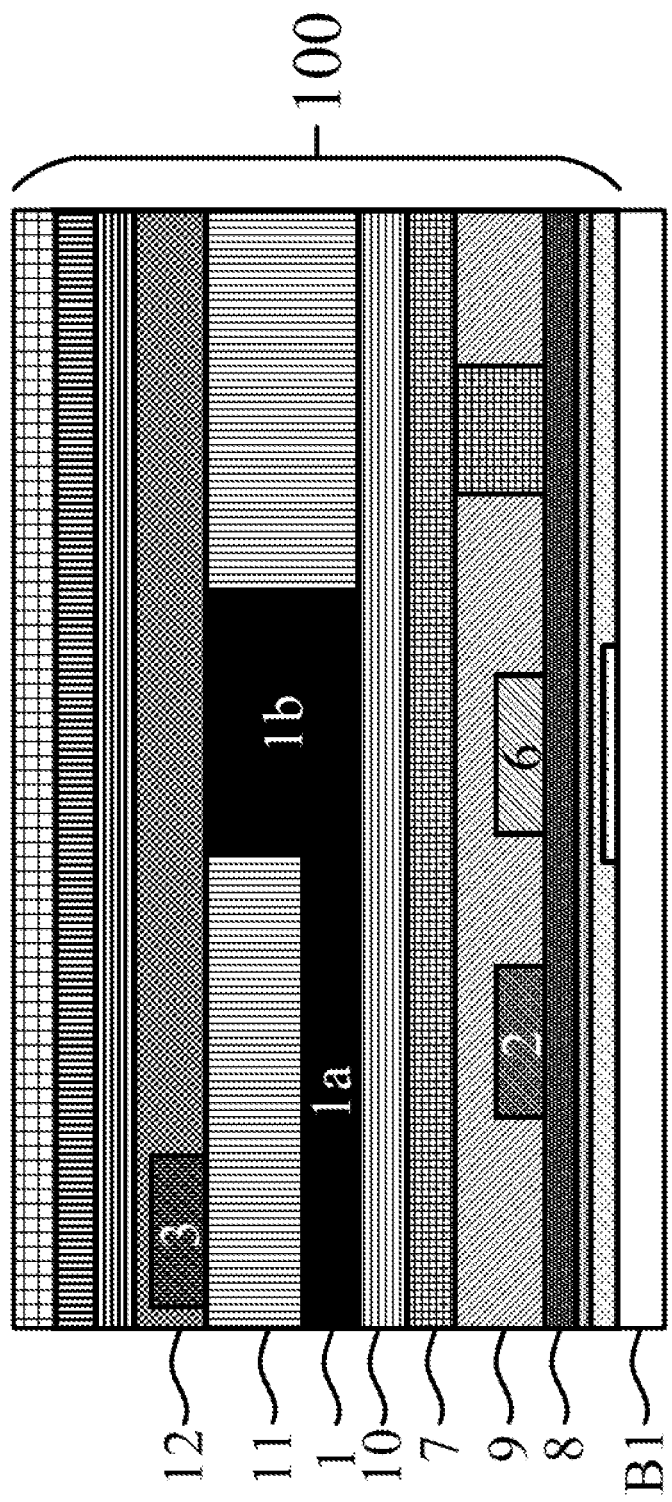
FIG. 3 is a cross-sectional view of a first display substrate in some embodiments according to the present disclosure.

FIG. 1 and FIG. 2 are schematic diagrams illustrating the structure of a first display substrate in some embodiments according to the present disclosure. In FIG. 1, a single one of the plurality of core-coil assemblies is shown. FIG. 2 shows four of the plurality of core-coil assemblies. FIG. 3 is a cross-sectional view of a first display substrate in some embodiments according to the present disclosure. Referring to FIG. 1 and FIG. 3, the core-coil assembly of the first display substrate 100 in some embodiments includes a first base substrate B1, a core layer on the first base substrate B1 and including a plurality of magnetic permeable cores 1, and a conductive coil (a path of which is indicated by dotted lines in FIG. 1) wound around the plurality of magnetic permeable cores 1 for multiple turns and insulated from the core layer.

Figure 4:
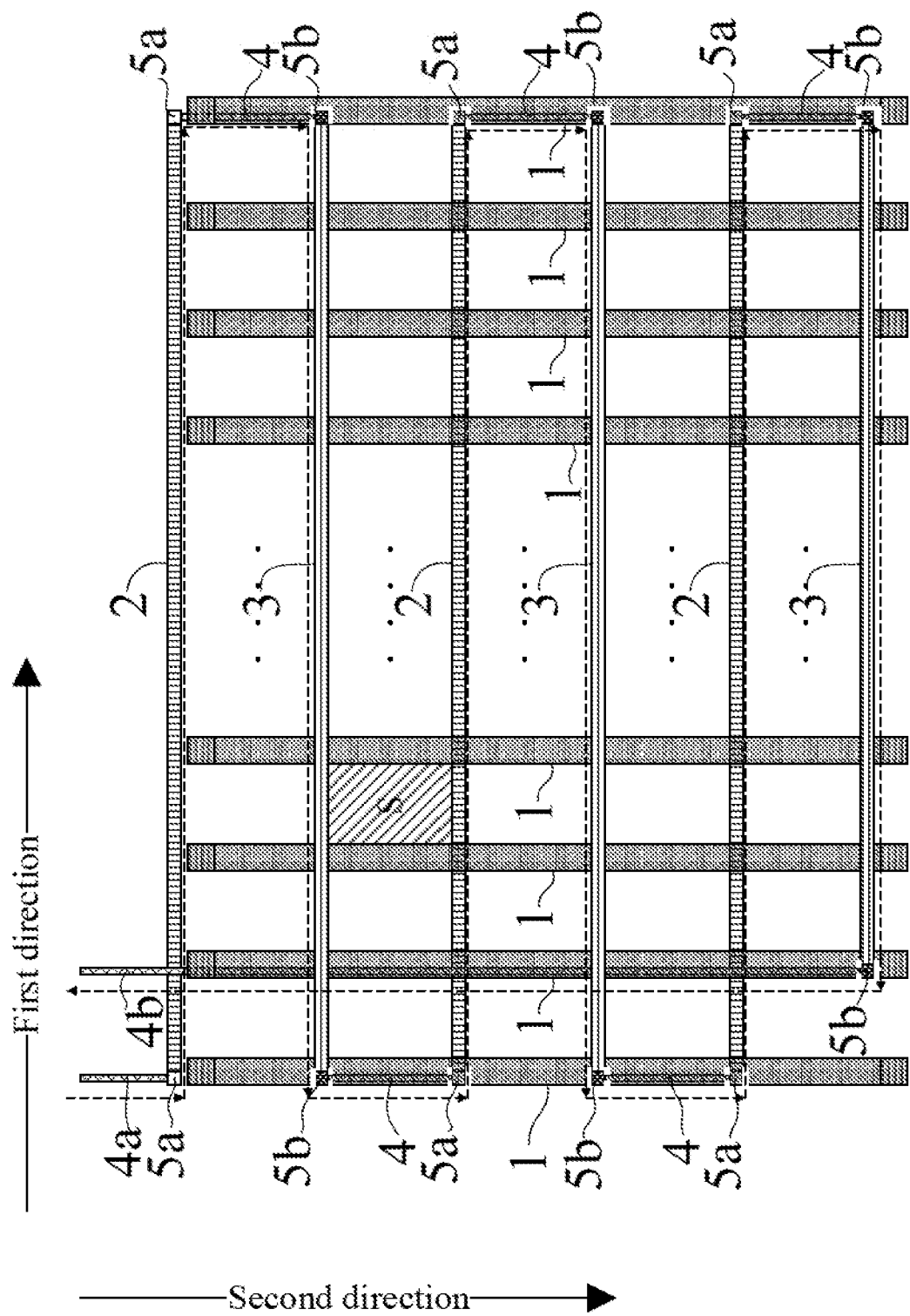
FIG. 4 is a schematic diagram illustrating the structure of a core-coil assembly in some embodiments according to the present disclosure.

FIG. 4 is a schematic diagram illustrating the structure of a core-coil assembly in some embodiments according to the present disclosure. Referring to FIG. 4, the plurality of magnetic permeable cores 1 are spaced apart from each other and arranged substantially along a first direction. Each of the plurality of magnetic permeable cores 1 extends substantially along a second direction. The conductive coil is insulated from the plurality of magnetic permeable cores 1. The conductive coil in some embodiments includes a first conductive line layer on a side of the core layer proximal to the first base substrate and including a plurality of first conductive lines 2 spaced apart from each other and crossing over the plurality of magnetic permeable cores 1; and a second conductive line layer on a side of the core layer distal to the first base substrate and including a plurality of second conductive lines 3 spaced apart from each other and crossing over the plurality of magnetic permeable cores 1. As shown in FIG. 4, projections of two adjacent first conductive lines of the plurality of first conductive lines 2 on the first base substrate in plan view of the first display substrate sandwiches a projection of one of the plurality of second conductive lines 3 on the first base substrate in plan view of the first display substrate, and projections of two adjacent second conductive lines of the plurality of second conductive lines 3 on the first base substrate in plan view of the first display substrate sandwiches a projection of one of the plurality of first conductive lines 2 on the first base substrate in plan view of the first display substrate. Optionally, conductive lines of the plurality of first conductive lines 2 are substantially parallel to each other. Optionally, conductive lines of the plurality of second conductive lines 3 are substantially parallel to each other. Optionally, conductive lines of the plurality of first conductive lines 2 and the plurality of second conductive lines 3 are substantially parallel to each other.

Referring to FIG. 1 and FIG. 2, the first display substrate in some embodiments further includes a gate line layer having a plurality of gate lines 6. Optionally, conductive lines of the plurality of first conductive lines 2 and the plurality of second conductive lines 3 are substantially parallel to the plurality of gate lines 6. Optionally, the gate line layer and the first conductive line layer are in a same layer and include a same material, e.g., the gate line layer and the first conductive line layer are patterned in a single process with a same conductive material using a single mask plate. Referring to FIG. 3, the plurality of gate lines 6 and the plurality of first conductive lines 2 are in a same layer, e.g., patterned in a single process with a same conductive material using a single mask plate. As used herein, the term "same layer" refers to the relationship between the layers simultaneously formed in a same step. In one example, the gate line layer and the first conductive line layer are in a same layer when they are formed as a result of one or more steps of a same patterning process performed in a same layer of material. In another example, the gate line layer and the first conductive line layer can be formed in a same layer by simultaneously performing the step of forming the gate line layer and the step of forming the first conductive line layer. The term "same layer" does not always mean that the thickness of the layer or the height of the layer in a cross-sectional view is the same.

Referring to FIG. 1 and FIG. 2, the first display substrate in some embodiments further includes a source-drain signal line layer having a plurality of source-drain signal lines 7. Optionally, the plurality of magnetic permeable cores 1 are substantially parallel to the plurality of source-drain signal lines 7 in plan view of the first display substrate. Optionally, projections of the plurality of magnetic permeable cores 1 on the first base substrate at least partially overlap with those of the plurality of source-drain signal lines 7. By having this design, the aperture ratio of the first display substrate can be enhanced.

In some embodiments, the conductive coil further includes a third conductive line layer on a side of the first conductive line layer proximal to the second conductive line layer, and on a side of the second conductive line layer proximal to the first conductive line layer, i.e., between the first conductive line layer and the second conductive line layer. Referring to FIG. 4, the third conductive line layer in some embodiments includes a plurality of third conductive lines 4, each of which electrically connects one of the plurality of first conductive lines 2 and one of the plurality of second conductive lines 3.

Referring to FIG. 1 and FIG. 2, the first display substrate in some embodiments further includes a source-drain signal line layer having a plurality of source-drain signal lines 7. Optionally, the plurality of third conductive lines 4 are substantially parallel to the plurality of source-drain signal lines 7. Optionally, the source-drain signal line layer and the third conductive line layer are in a same layer and includes a same material, e.g., the source-drain signal line layer and the third conductive line layer are patterned in a single process with a same conductive material using a single mask plate. Optionally, the plurality of source-drain signal lines 7 and the plurality of third conductive lines 4 are in a same layer, e.g., patterned in a single process with a same conductive material using a single mask plate.

In some embodiments, the first display substrate further includes a first insulating layer between the first conductive line layer and the third conductive line layer and a second insulating layer between the second conductive line layer and the third conductive line layer. Each of the plurality of third conductive lines 4 is electrically connected to one of the plurality of first conductive lines 2 through a first via extending through the first insulating layer. Each of the plurality of third conductive lines 4 is electrically connected to one of the plurality of second conductive lines 3 through a second via extending through the second insulating layer.

Referring to FIG. 3, the first conductive line layer having the plurality of first conductive lines 2 is insulated from the third conductive line layer (in a same layer as the plurality of source-drain signal lines 7 in FIG. 3) by an interlayer dielectric layer 9. Referring to FIG. 1, FIG. 3, and FIG. 4, each of the plurality of third conductive lines 4 is electrically connected to one of the plurality of first conductive lines 2 through a first via 5a extending through the interlayer dielectric layer 9. Referring to FIG. 3, the second conductive line layer having the plurality of second conductive lines 3 is insulating from the core layer having the plurality of magnetic permeable cores 1 by a planarization layer 11, and the core layer having the plurality of magnetic permeable cores 1 is insulating from the third conductive line layer (in a same layer as the plurality of source-drain signal lines 7 in FIG. 3) by a core insulating layer 10. Referring to FIG. 1, FIG. 3, and FIG. 4, each of the plurality of third conductive lines 4 is electrically connected to one of the plurality of second conductive lines 3 through a second via 5b extending through the planarization layer 11 and the core insulating layer 10. As shown in FIG. 4, each of the plurality of third conductive lines 4 electrically connects adjacent terminals of one of the plurality of first conductive lines 2 and one of the plurality of second conductive lines 3. The plurality of first conductive lines 2 and the plurality of second conductive lines 3 are interconnected by the plurality of third conductive lines 4 in this fashion, forming a conductive coil wound around the plurality of magnetic permeable cores 1 for multiple turns and insulated from the core layer.

Referring to FIG. 1 and FIG. 4, the first display substrate in some embodiments further includes an input signal line 4a configured to transmit a touch input signal to the conductive coil. The input signal line 4a may be disposed in any appropriate layer and may be electrically connected to the conductive coil through a via. Referring to FIG. 4, the input signal line 4a in some embodiments is in a same layer as the third conductive line layer having the plurality of third conductive lines 4, e.g., the third conductive line layer further includes the input signal line 4a. Optionally, the input signal line 4a and the plurality of third conductive lines 4 are patterned in a single process with a same conductive material using a single mask plate. Optionally, the input signal line 4a is electrically connected to one of the plurality of second conductive lines 3, e.g., through a second via 5b extending through the planarization layer 11 and the core insulating layer 10. Optionally, and as shown in FIG. 4, the input signal line 4a is electrically connected to one of the plurality of first conductive lines 2, e.g., through a first via 5a extending through the interlayer dielectric layer 9.

Referring to FIG. 1 and FIG. 4, the first display substrate in some embodiments further includes an output signal line 4b configured to sense a touch signal generated in a corresponding core-coil assembly of the plurality of core-coil assemblies. The output signal line 4b may be disposed in any appropriate layer and may be electrically connected to the conductive coil through a via. Referring to FIG. 4, the output signal line 4b in some embodiments is in a same layer as the third conductive line layer having the plurality of third conductive lines 4, e.g., the third conductive line layer further includes the output signal line 4b. Optionally, the output signal line 4b and the plurality of third conductive lines 4 are patterned in a single process with a same conductive material using a single mask plate. Optionally, the input signal line 4a, the output signal line 4b, and the plurality of third conductive lines 4 are patterned in a single process with a same conductive material using a single mask plate. Optionally, the output signal line 4b is electrically connected to one of the plurality of first conductive lines 2, e.g., through a first via 5a extending through the interlayer dielectric layer 9. Optionally, and as shown in FIG. 4, the output signal line 4b is electrically connected to one of the plurality of second conductive lines 3, e.g., through a second via 5b extending through the planarization layer 11 and the core insulating layer 10.

Referring to FIG. 4, in some embodiments, projections of the plurality of magnetic permeable cores 1 on the first base substrate in plan view of the first display substrate substantially cover projections of the plurality of third conductive lines 4 on the first base substrate in plan view of the first display substrate, except that the plurality of third conductive lines 4 are insulated from the plurality of magnetic permeable cores 1. For example, in regions surrounding the first via 5a and the second via 5b, to ensure that the plurality of third conductive lines 4 are insulated from the plurality of magnetic permeable cores 1, projections of the plurality of magnetic permeable cores 1 on the first base substrate do not cover those of the plurality of third conductive lines 4. By having this design, the aperture ratio of the first display substrate can be enhanced.

In some embodiments, the plurality of core-coil assemblies are disposed substantially in an inter-subpixel region of the first display substrate. For example, the plurality of magnetic permeable cores 1, the plurality of first conductive lines 2, the plurality of second conductive lines 3, the plurality of third conductive lines 4, the input signal line 4a, and the output signal line 4b are substantially in the inter-subpixel region of the first display substrate. As used herein, an inter-subpixel region refers to a region between adjacent subpixel regions, such as a region corresponding to a black matrix in a liquid crystal display or a region corresponding a pixel definition layer in an organic light emitting diode display panel. Optionally, the inter-subpixel region is a region between adjacent subpixel regions in a same pixel. Optionally, the inter-subpixel region is a region between two adjacent subpixel regions from two adjacent pixels. Optionally, the inter-subpixel region is a region between a subpixel region of a red color subpixel and a subpixel region of an adjacent green color subpixel. Optionally, the inter-subpixel region is a region between a subpixel region of a red color subpixel and a subpixel region of an adjacent blue color subpixel. Optionally, the inter-subpixel region is a region between a subpixel region of a green color subpixel and a subpixel region of an adjacent blue color subpixel. As used herein, a subpixel region refers to a light emission region of a subpixel, such as a region corresponding to a pixel electrode in a liquid crystal display or a region corresponding to a light emissive layer in an organic light emitting diode display panel. Optionally, a pixel may include a number of separate light emission regions corresponding to a number of subpixels in the pixel. Optionally, the subpixel region is a light emission region of a red color subpixel. Optionally, the subpixel region is a light emission region of a green color subpixel. Optionally, the subpixel region is a light emission region of a blue color subpixel. Optionally, the subpixel region is a light emission region of a white color subpixel. By having the plurality of core-coil assemblies disposed substantially in the inter-subpixel region, the aperture ratio of the first display substrate can be enhanced.

In some embodiments, an area in a plan view of the first display substrate defined by two adjacent magnetic permeable cores of the plurality of magnetic permeable cores 1 and two adjacent conductive lines of the conductive coil (e.g., an area S as shown in FIG. 4) may include any appropriate number of subpixels, e.g., from one to hundreds of subpixels.

Referring to FIG. 3, each of the plurality of magnetic permeable cores 1 in some embodiments includes a middle portion 1a and two terminal portions 1b respectively at two ends of the middle portion 1a. The middle portion 1a has a thickness less than those of the two terminal portions 1b. Optionally, the first display substrate further includes a coil insulating layer 12 on a side of the second conductive line layer having the plurality of second conductive lines 3 distal to the first base substrate B1, and a gate insulating layer 8 on a side of the gate line layer having the plurality of gate lines 6 proximal to the first base substrate B1.

Referring to FIG. 2, the input signal lines 4a and the output signal lines 4b for the plurality of core-coil assemblies extend in and out of the first display substrate on a single side of the first display substrate. In a display panel having the first display substrate, the input signal lines 4a and the output signal lines 4b can be connected to a driving chip in a bonding area of the display panel disposed on one side of the display panel.

Various appropriate magnetic permeable materials may be used to make the plurality of magnetic permeable cores 1. Examples of magnetic permeable materials include, but are not limited to, silicon steel, ferrite, various permalloys such as iron-nickel alloy, iron-cobalt alloy (e.g., 50% w/w iron and 50% w/w cobalt), and neodymium-iron-boron alloy.

Figure 5:
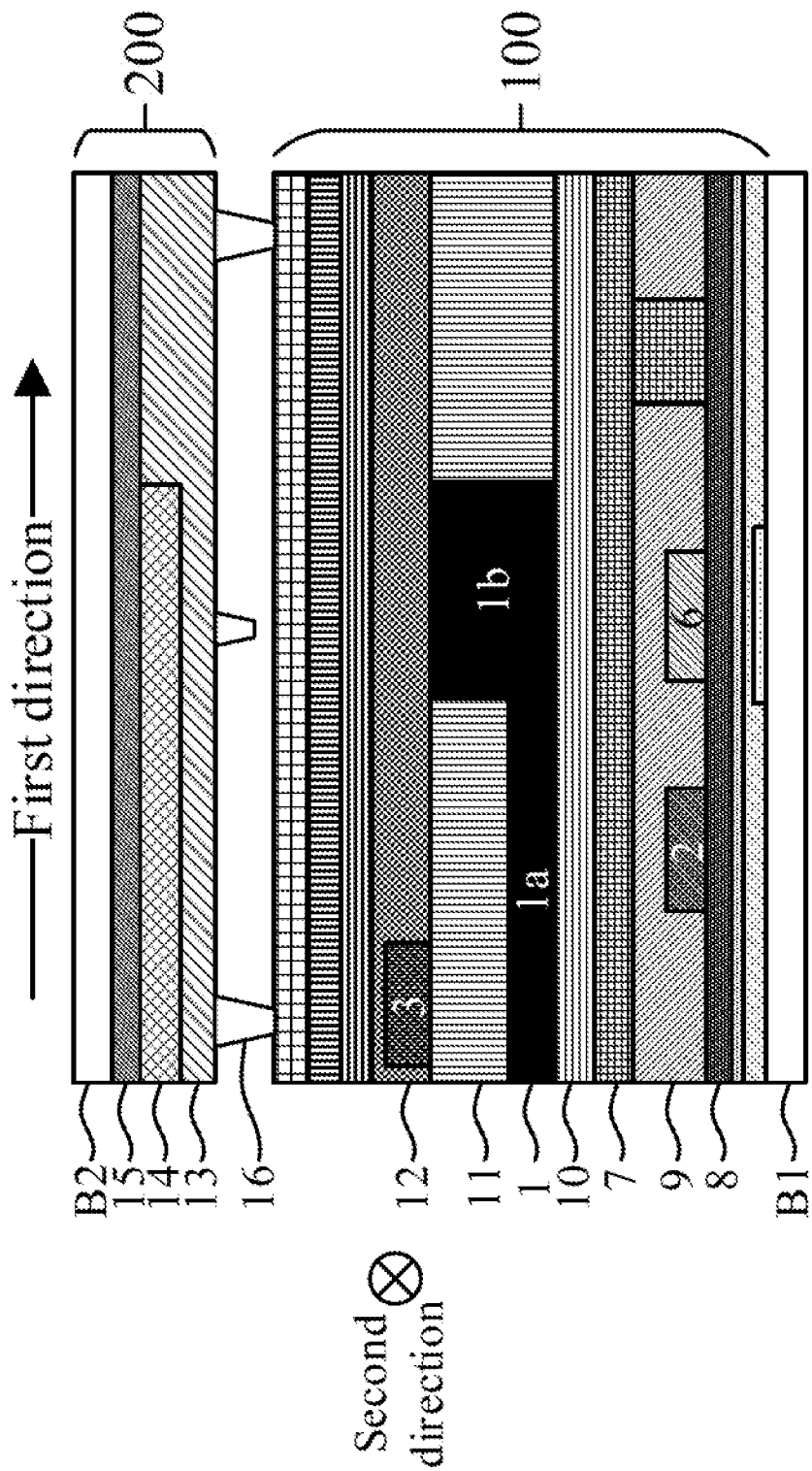
FIG. 5 is a cross-sectional view of a display panel in some embodiments according to the present disclosure.

In another aspect, the present disclosure further provides a display panel having the first display substrate described herein. Optionally, the first display substrate is an array substrate of the display panel. FIG. 5 is a cross-sectional view of a display panel in some embodiments according to the present disclosure. Referring to FIG. 5, the display panel in some embodiments includes a first display substrate 100 and a second display substrate 200 facing the first display substrate 100 and spaced apart from the first display substrate 100, e.g., by a spacer layer 16. In some embodiments, the second display substrate 200 includes a target layer having a plurality of magnetic permeable targets 14 substantially along the first direction and spaced apart from each other, each of the plurality of magnetic permeable targets 14 extending substantially along the second direction. Various appropriate magnetic permeable materials may be used to make the plurality of magnetic permeable targets 14. Examples of magnetic permeable materials include, but are not limited to, silicon steel, ferrite, various permalloys such as iron-nickel alloy, iron-cobalt alloy (e.g., 50% w/w iron and 50% w/w cobalt), and neodymium-iron-boron alloy.

In FIG. 5, the second display substrate 200 includes a second base substrate B2, a black matrix layer 15 on the second base substrate B2, the target layer having a plurality of magnetic permeable targets 14 on a side of the black matrix layer 15 distal to the second base substrate B2, and an overcoat layer 13 on a side of the target layer having a plurality of magnetic permeable targets 14 distal to the second base substrate B2. Optionally, the target layer having a plurality of magnetic permeable targets 14 is substantially in the inter-subpixel region of the second display substrate 200. Optionally, a projection of the black matrix layer 15 on the second base substrate B2 in plan view of the second display substrate 200 at least partially overlaps with those of the plurality of magnetic permeable targets 14. Optionally, a projection of the black matrix layer 15 on the second base substrate B2 in plan view of the second display substrate 200 substantially covers those of the plurality of magnetic permeable targets 14. FIG. 6 is a schematic diagram illustrating the structure of a target layer in some embodiments according to the present disclosure.

In some embodiments, the plurality of magnetic permeable targets 14 in the second display substrate 200 respectively correspond to the plurality of magnetic permeable cores 1 in the first display substrate 100. Optionally, projections of the plurality of magnetic permeable cores 1 on the first base substrate B1 in plan view of the display panel at least partially overlap with those of the plurality of magnetic permeable targets 14. Optionally, projections of the plurality of magnetic permeable cores 1 on the first base substrate B1 in plan view of the display panel substantially overlap with those of the plurality of magnetic permeable targets 14. Optionally, a projection of each of the plurality of magnetic permeable targets 14 on the first base substrate B1 in plan view of the display panel has substantially the same area as a projection of a corresponding one of the plurality of magnetic permeable cores 1 on the first base substrate B1 in plan view of the display panel. Optionally, a projection of each of the plurality of magnetic permeable targets 14 on the first base substrate B1 in plan view of the display panel has substantially the same width and length as a projection of a corresponding one of the plurality of magnetic permeable cores 1 on the first base substrate B1 in plan view of the display panel.

In some embodiments, the plurality of magnetic permeable targets 14 are configured to be movable relative to the plurality of magnetic permeable cores 1 in response to pressure from a touch, thereby resulting in a change in a reluctance of a magnetic field and a change in an inductance of the conductive coil. In one example, when one of the plurality of magnetic permeable targets 14 is moved closer to one of the plurality of magnetic permeable cores 1 in response to pressure from a touch, the reluctance of the magnetic field of the core-coil assembly having the one of the plurality of magnetic permeable targets 14 decreases, and an inductance of the conductive coil of the core-coil assembly increases. In another example, when one of the plurality of magnetic permeable targets 14 is moved away from one of the plurality of magnetic permeable cores 1, the reluctance of the magnetic field of the core-coil assembly having the one of the plurality of magnetic permeable targets 14 increases, and an inductance of the conductive coil of the core-coil assembly decreases. Optionally, the inductance of the conductive coil of the core-coil assembly can be determined according to the following equation:

$$L = \frac{N\Phi}{I} = \frac{IN}{R_M}; \quad (1)$$

wherein L stands for the inductance of the conductive coil of the core-coil assembly, N stands for the number of turns of the conductive coil in the core-coil assembly, and Rm stands for the reluctance of the magnetic field of the core-coil assembly.

The correlation between the inductance of the conductive coil of the core-coil assembly and a core-coil distance S can be determined according to the following equation:

$$L = L_0 + \Delta L = \frac{N^2 \mu_0 A}{2(\delta_0 - \Delta\delta)} = \frac{L_0}{1 - \frac{\Delta\delta}{\delta_0}}; \quad (2)$$

wherein the $\delta_0$ is an initial core-coil distance, and $\Delta\delta$ is a change in the core-coil distance (e.g., a displacement), $L_0$ is an initial inductance of the conductive coil of the core-coil assembly when the core-coil distance is $\delta_0$, and L is the inductance of the conductive coil of the core-coil assembly when the core-coil distance is changed by $\Delta\delta$.

Referring to FIG. 5, the display panel in some embodiments includes a spacer layer 16 spacing apart the first display substrate 100 and the second display substrate 200 thereby forming a gap G between the core layer and the target layer. The gap G may be an air gap or a vacuum gap. Optionally, the gap G includes an elastic material, i.e., the gap G is an elastic material layer. In response to pressure from a touch, a thickness of the gap G decreases. Optionally, a decrease in the thickness of the gap G results in a decrease in the reluctance of the magnetic field and an increase in the inductance of the conductive coil. Optionally, an increase in the thickness of the gap G results in an increase in the reluctance of the magnetic field and a decrease in the inductance of the conductive coil.

Accordingly, by measuring a change in the inductance of the conductive coil of the core-coil assembly (e.g., through the output signal line 4b in FIG. 4), the displacement of the second display substrate 200 relative to the first display substrate 100 caused by the touch (e.g., a change $\Delta\delta$ in the core-coil distance) can be determined. The magnitude of the displacement correlates to a magnitude of pressure applied during a touch. Thus, in the present display panel, a three-dimensional touch detection can be achieved.

In some embodiments, the display panel is operated in a time-division driving mode having a display mode and a touch control mode. In the touch control mode, the conductive coil is configured to conduct touch signal, and image display is halted in the touch control mode. In the display mode, the display panel is configured to display image, and the touch control function is halted.

The present touch control display panel provides a high resolution three-dimensional touch detection. The present touch control display panel is capable of detecting a vertical displacement caused by the touch equal to or smaller than 0.1 μm, and an angular displacement caused by the touch equal to or smaller than 0.1 arcsecond. Moreover, a sensitive touch signal can be obtained, with a voltage sensitivity up to hundreds of mV/mm. The touch detection by the present touch control display panel is highly repeatable and have an excellent linearity in a broad displacement range. Further, the present touch control display panel has a simply structure allowing a high aperture ratio of the display panel.

In another aspect, the present disclosure provides a touch panel having a first display substrate described herein and a second display substrate facing the first display substrate and spaced apart from the first display substrate. In some embodiments, the second display substrate of the touch panel includes a target layer having a plurality of magnetic permeable targets substantially along the first direction and spaced apart from each other, each of the plurality of magnetic permeable targets extending substantially along the second direction. The plurality of magnetic permeable targets in the second display substrate respectively correspond to the plurality of magnetic permeable cores in the first display substrate. Optionally, projections of the plurality of magnetic permeable cores on the first base substrate in plan view of the touch panel at least partially overlap with those of the plurality of magnetic permeable targets. Optionally, projections of the plurality of magnetic permeable cores on the first base substrate in plan view of the touch panel substantially overlap with those of the plurality of magnetic permeable targets. Optionally, a projection of each of the plurality of magnetic permeable targets on the first base substrate in plan view of the touch panel has substantially the same area as a projection of a corresponding one of the plurality of magnetic permeable cores on the first base substrate in plan view of the touch panel. Optionally, a projection of each of the plurality of magnetic permeable targets on the first base substrate in plan view of the touch panel has substantially the same width and length as a projection of a corresponding one of the plurality of magnetic permeable cores on the first base substrate in plan view of the touch panel.

The plurality of magnetic permeable targets in the touch panel are configured to be movable relative to the plurality of magnetic permeable cores in response to pressure from a touch, thereby resulting in a change in a reluctance of a magnetic field and a change in an inductance of the conductive coil. In one example, when one of the plurality of magnetic permeable targets is moved closer to one of the plurality of magnetic permeable cores in response to pressure from a touch, the reluctance of the magnetic field of the core-coil assembly having the one of the plurality of magnetic permeable targets decreases, and an inductance of the conductive coil of the core-coil assembly increases. In another example, when one of the plurality of magnetic permeable targets of the touch panel is moved away from one of the plurality of magnetic permeable cores, the reluctance of the magnetic field of the core-coil assembly having the one of the plurality of magnetic permeable targets increases, and an inductance of the conductive coil of the core-coil assembly decreases.

Optionally, the touch panel is an in-cell touch panel. Optionally, the touch panel is an on-cell touch panel. Optionally, the touch panel is an add-on type touch panel. Optionally, the add-on type touch panel is a one-glass-solution type touch panel. Optionally, the add-on type touch panel is a glass-film-film type touch panel.

In another aspect, the present disclosure provides a touch control display apparatus having a touch control display panel described herein. Examples of appropriate touch control display apparatuses include, but are not limited to, a liquid crystal display panel, an organic light emitting display panel, an electronic paper, a mobile phone, a tablet computer, a television, a monitor, a notebook computer, a digital album, a GPS, etc.

In another aspect, the present disclosure provides a method of fabricating a first display substrate having a plurality of core-coil assemblies configured to detect a touch. In some embodiments, the method includes forming the plurality of core-coil assemblies. Optionally, the step of forming each of the plurality of core-coil assemblies includes forming a core layer on a first base substrate. The step of forming the core layer includes forming a plurality of magnetic permeable cores substantially along a first direction and spaced apart from each other. Each of the plurality of magnetic permeable cores is formed to extend substantially along a second direction. Optionally, the method further includes forming a conductive coil wound around the plurality of magnetic permeable cores for multiple turns and insulated from the core layer.

In some embodiments, the step of forming the conductive coil includes forming a first conductive line layer on a side of the core layer proximal to the first base substrate, and forming a second conductive line layer on a side of the core layer distal to the first base substrate. The step of forming the first conductive line layer includes forming a plurality of first conductive lines spaced apart from each other and crossing over the plurality of magnetic permeable cores. The step of forming the second conductive line layer includes forming a plurality of second conductive lines spaced apart from each other and crossing over the plurality of magnetic permeable cores. Optionally, the first conductive line layer and the second conductive line layer are formed so that projections of two adjacent first conductive lines of the plurality of first conductive lines on the first base substrate sandwiches a projection of one of the plurality of second conductive lines on the first base substrate; and projections of two adjacent second conductive lines of the plurality of second conductive lines on the first base substrate sandwiches a projection of one of the plurality of first conductive lines on the first base substrate.

In some embodiments, the step of forming the conductive coil further includes forming a third conductive line layer on side of the first conductive line layer proximal to the second conductive line layer. Optionally, the step of forming the third conductive line layer includes forming a plurality of third conductive lines. Each of the plurality of third conductive lines is formed to electrically connect one of the plurality of first conductive lines and one of the plurality of second conductive lines.

In some embodiments, the method further includes forming a first insulating layer between the first conductive line layer and the third conductive line layer. Optionally, the method further includes forming a first via extending through the first insulating layer. Each of the plurality of third conductive lines is formed to be electrically connected to one of the plurality of first conductive lines through the first via extending through the first insulating layer.

In some embodiments, the method further includes forming a second insulating layer between the second conductive line layer and the third conductive line layer. Optionally, the method further includes forming a second via extending through the second insulating layer. Each of the plurality of third conductive lines is formed to be electrically connected to one of the plurality of second conductive lines through the second via extending through the second insulating layer.

Optionally, each of the plurality of third conductive lines is formed to electrically connect adjacent terminals of one of the plurality of first conductive lines and one of the plurality of second conductive lines.

In some embodiments, the method further includes forming an input signal line configured to transmit a touch input signal to the conductive coil. Optionally, the step of forming the third conductive line layer includes forming the input signal line configured to transmit a touch input signal to the conductive coil, e.g., the plurality of third conductive lines and the input signal line are formed in a same process, in a same layer, with a same mask plate, and using a same conductive material.

In some embodiments, the method further includes forming an output signal line configured to sense a touch signal generated in a corresponding core-coil assembly of the plurality of core-coil assemblies. Optionally, the step of forming the third conductive line layer includes forming the output signal line configured to sense a touch signal generated in a corresponding core-coil assembly of the plurality of core-coil assemblies. In one example, the plurality of third conductive lines and the output signal line are formed in a same process, in a same layer, with a same mask plate, and using a same conductive material. Optionally, the plurality of third conductive lines, the input signal line, and the output signal line are formed in a same process, in a same layer, with a same mask plate, and using a same conductive material.

In some embodiments, the core layer and the third conductive line layer are formed so that projections of the plurality of magnetic permeable cores on the first base substrate substantially cover projections of the plurality of third conductive lines on the first substrate to the extent that the plurality of third conductive lines are insulated from the plurality of magnetic permeable cores. For example, in regions surrounding the first via and the second via, to ensure that the plurality of third conductive lines are insulated from the plurality of magnetic permeable cores, projections of the plurality of magnetic permeable cores on the first base substrate do not cover those of the plurality of third conductive lines.

In some embodiments, the method further includes forming a gate line layer having a plurality of gate lines. Optionally, the gate line layer and the first conductive line layer are formed in a same process, in a same layer, with a same mask plate, and using a same conductive material.

In some embodiments, the method further includes forming a source-drain signal line layer having a plurality of source-drain signal lines. Optionally, the source-drain signal line layer and the third conductive line layer are formed in a same process, in a same layer, with a same mask plate, and using a same conductive material.

In some embodiments, the method further includes forming a core insulating layer between the core layer and the third conductive line layer and between the core layer and the source-drain signal line layer. In some embodiments, the method further includes forming an interlayer dielectric layer between the first conductive line layer and the third conductive line layer and between the first conductive line layer and the source-drain signal line layer.

Optionally, the plurality of magnetic permeable cores, the plurality of first conductive lines, the plurality of second conductive lines, and the plurality of third conductive lines are substantially formed in an inter-subpixel region of the first display substrate.

Optionally, each of the plurality of magnetic permeable cores is formed to have a middle portion and two terminal portions respectively at two ends of the middle portion. The middle portion is formed to have a thickness less than those of the two terminal portions.

In another aspect, the present disclosure provides a method of fabricating a display panel having a first display substrate described herein. In some embodiments, the first display substrate is an array substrate of the display panel. In some embodiments, the method includes forming the first display substrate as described herein, and forming a second display substrate facing the first display substrate and spaced apart from the first display substrate. Optionally, the step of forming the second display substrate includes forming a target layer having a plurality of magnetic permeable targets substantially arranged along the first direction and spaced apart from each other. Optionally, each of the plurality of magnetic permeable targets is formed to extend substantially along the second direction.

Optionally, the plurality of magnetic permeable cores and the plurality of magnetic permeable targets are formed so that projections of the plurality of magnetic permeable cores on the first base substrate at least partially overlap with those of the plurality of magnetic permeable targets. Optionally, the plurality of magnetic permeable cores and the plurality of magnetic permeable targets are formed so that projections of the plurality of magnetic permeable cores on the first base substrate substantially overlap with those of the plurality of magnetic permeable targets.

Optionally, the plurality of magnetic permeable cores and the plurality of magnetic permeable targets are formed so that the plurality of magnetic permeable targets are configured to be movable relative to the plurality of magnetic permeable cores in response to pressure from a touch, thereby resulting in a change in a reluctance of a magnetic field and a change in an inductance of the conductive coil.

Optionally, the method further includes forming a spacer layer spacing apart the first display substrate and the second display substrate thereby forming a gap between the core layer and the target layer. A decrease in a thickness of the air gap results in a decrease in the reluctance of the magnetic field and an increase in the inductance of the conductive coil.

Optionally, the step of forming the second display substrate further includes forming a black matrix layer on a second base substrate. The plurality of magnetic permeable targets are formed so that a projection of the black matrix layer on the second base substrate substantially covers those of the plurality of magnetic permeable targets.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A first display substrate, comprising a plurality of core-coil assemblies configured to detect a touch, a respective one of the plurality of core-coil assemblies comprising:
   a first base substrate;
   a gate line layer comprising a plurality of gate lines;
   a core layer on the first base substrate and comprising a plurality of magnetic permeable cores substantially along a first direction and spaced apart from each other, a respective one of the plurality of magnetic permeable cores substantially along a second direction; and a conductive coil wound around the plurality of magnetic permeable cores for multiple turns and insulated from the core layer;

wherein the conductive coil comprises:

a first conductive line layer on a side of the core layer proximal to the first base substrate and comprising a plurality of first conductive lines spaced apart from each other and crossing over the plurality of magnetic permeable cores; and a second conductive line layer on a side of the core layer distal to the first base substrate and comprising a plurality of second conductive lines spaced apart from each other and crossing over the plurality of magnetic permeable cores;

wherein the gate line layer and the first conductive line layer are in a same layer and comprises a same material.

2. The first display substrate of claim 1, wherein projections of two adjacent first conductive lines of the plurality of first conductive lines on the first base substrate sandwiches a projection of one of the plurality of second conductive lines on the first base substrate; and projections of two adjacent second conductive lines of the plurality of second conductive lines on the first base substrate sandwiches a projection of one of the plurality of first conductive lines on the first base substrate.

3. The first display substrate of claim 1, wherein the conductive coil further comprises:

a third conductive line layer on side of the first conductive line layer proximal to the second conductive line layer and comprising a plurality of third conductive lines;

wherein a respective one of the plurality of third conductive lines electrically connects one of the plurality of first conductive lines and one of the plurality of second conductive lines.

4. The first display substrate of claim 3, further comprising a first insulating layer between the first conductive line layer and the third conductive line layer; and a second insulating layer between the second conductive line layer and the third conductive line layer;

wherein the respective one of the plurality of third conductive lines is electrically connected to one of the plurality of first conductive lines through a first via extending through the first insulating layer; and the respective one of the plurality of third conductive lines is electrically connected to one of the plurality of second conductive lines through a second via extending through the second insulating layer.

5. The first display substrate of claim 3, wherein the respective one of the plurality of third conductive lines electrically connects adjacent terminals of one of the plurality of first conductive lines and one of the plurality of second conductive lines.

6. The first display substrate of claim 3, wherein the third conductive line layer further comprises an input signal line configured to transmit a touch input signal to the conductive coil; and an output signal line configured to sense a touch signal generated in a corresponding core-coil assembly of the plurality of core-coil assemblies.

7. The first display substrate of claim 3, wherein projections of the plurality of magnetic permeable cores on the first base substrate substantially cover projections of the plurality of third conductive lines on the first base substrate; and the plurality of third conductive lines are insulated from the plurality of magnetic permeable cores.

8. A first display substrate, comprising:

a plurality of core-coil assemblies configured to detect a touch; and a source-drain signal line layer comprising a plurality of source-drain signal lines;

wherein a respective one of the plurality of core-coil assemblies comprises:

a first base substrate;

a core layer on the first base substrate and comprising a plurality of magnetic permeable cores substantially along a first direction and spaced apart from each other, a respective one of the plurality of magnetic permeable cores substantially along a second direction; and a conductive coil wound around the plurality of magnetic permeable cores for multiple turns and insulated from the core layer;

wherein the conductive coil comprises:

a first conductive line layer on a side of the core layer proximal to the first base substrate and comprising a plurality of first conductive lines spaced apart from each other and crossing over the plurality of magnetic permeable cores;

a second conductive line layer on a side of the core layer distal to the first base substrate and comprising a plurality of second conductive lines spaced apart from each other and crossing over the plurality of magnetic permeable cores; and a third conductive line layer on side of the first conductive line layer proximal to the second conductive line layer and comprising a plurality of third conductive lines;

wherein a respective one of the plurality of third conductive lines electrically connects one of the plurality of first conductive lines and one of the plurality of second conductive lines;

wherein the source-drain signal line layer and the third conductive line layer are in a same layer and comprises a same material.

9. The first display substrate of claim 8, further comprising a core insulating layer between the core layer and the third conductive line layer and between the core layer and the source-drain signal line layer; and an interlayer dielectric layer between the first conductive line layer and the third conductive line layer and between the first conductive line layer and the source-drain signal line layer.

10. The first display substrate of claim 3, wherein the plurality of magnetic permeable cores, the plurality of first conductive lines, the plurality of second conductive lines, and the plurality of third conductive lines are substantially in an inter-subpixel region of the first display substrate.

11. The first display substrate of claim 1, wherein a respective one of the plurality of magnetic permeable cores comprises a middle portion and two terminal portions respectively at two ends of the middle portion; and the middle portion has a thickness less than those of the two terminal portions.

12. A display panel, comprising a first display substrate; and a second display substrate facing the first display substrate and spaced apart from the first display substrate;

wherein the first display substrate comprises a plurality of core-coil assemblies configured to detect a touch, wherein a respective one of the plurality of core-coil assemblies comprises:

a first base substrate;

a core layer on the first base substrate and comprising a plurality of magnetic permeable cores substantially along a first direction and spaced apart from each other, a respective one of the plurality of magnetic permeable cores substantially along a second direction; and a conductive coil wound around the plurality of magnetic permeable cores for multiple turns and insulated from the core layer;

wherein the second display substrate comprises a target layer comprising a plurality of magnetic permeable targets substantially along the first direction and spaced apart from each other, a respective one of the plurality of magnetic permeable targets substantially along the second direction.

13. The display panel of claim 12, wherein projections of the plurality of magnetic permeable cores on the first base substrate at least partially overlap with those of the plurality of magnetic permeable targets.

14. The display panel of claim 12, wherein projections of the plurality of magnetic permeable cores on the first base substrate substantially overlap with those of the plurality of magnetic permeable targets.

15. The display panel of claim 12, wherein the plurality of magnetic permeable targets are configured to be movable relative to the plurality of magnetic permeable cores in response to pressure from a touch, thereby resulting in a change in a reluctance of a magnetic field and a change in an inductance of the conductive coil.

16. The display panel of claim 15, comprising a spacer layer spacing apart the first display substrate and the second display substrate thereby forming a gap between the core layer and the target layer;

wherein a decrease in a thickness of the gap results in a decrease in the reluctance of the magnetic field and an increase in the inductance of the conductive coil.

17. The display panel of claim 12, wherein the second display substrate further comprises a black matrix layer on a second base substrate; and a projection of the black matrix layer on the second base substrate substantially covers those of the plurality of magnetic permeable targets.

18. The display panel of claim 12, wherein the display panel is operated in a time-division driving mode comprising a display mode and a touch control mode; and the conductive coil is configured to conduct touch signal during the touch control mode.

* * * * *